(12) United States Patent
Madhuranath et al.

(10) Patent No.: US 9,892,452 B2
(45) Date of Patent: Feb. 13, 2018

(54) METHOD FOR REPLACING A TEXTURE OF AN APPAREL WITH AN OTHER TEXTURE PRESERVING THE WRINKLES, IN A VIDEO FILE

(71) Applicant: Infosys Limited, Bangalore (IN)

(72) Inventors: Himesh Madhuranath, Bangalore (IN); Ravindra Babu Tallamraju, Bangalore (IN); Subrahmanya Sreenivasan Venkateshaiah, Bangalore (IN)

(73) Assignee: Infosys Limited, Bangalore (IN)

( * ) Notice: Subject to any disclaimer, the term of this patent is extended or adjusted under 35 U.S.C. 154(b) by 626 days.

(21) Appl. No.: 14/580,015

(22) Filed: Dec. 22, 2014

(65) Prior Publication Data

US 2015/0186987 A1 Jul. 2, 2015

(30) Foreign Application Priority Data

Dec. 26, 2013 (IN) .......................... 6084/CHE/2013

(51) Int. Cl.
  *G06Q 30/06* (2012.01)
  *G06T 7/90* (2017.01)
  *G06K 9/46* (2006.01)

(52) U.S. Cl.
  CPC ........... *G06Q 30/0643* (2013.01); *G06T 7/90* (2017.01); *G06K 9/4642* (2013.01); *G06T 2207/10016* (2013.01); *G06T 2207/20104* (2013.01); *G06T 2207/30196* (2013.01)

(58) Field of Classification Search
  CPC .................. G06C 30/0643; G06T 7/90; G06T 2207/10016; G06T 2207/20104; G06T 2207/30196; G06K 9/4642
  See application file for complete search history.

(56) References Cited

U.S. PATENT DOCUMENTS

| 6,453,069 B1* | 9/2002 | Matsugu | ................. G06K 9/48 382/173 |
| 2014/0149264 A1* | 5/2014 | Satyanarayana | ....... G06Q 30/06 705/27.2 |

* cited by examiner

*Primary Examiner* — Edward Park
(74) *Attorney, Agent, or Firm* — Klarquist Sparkman, LLP

(57) ABSTRACT

The present disclosure provides virtual replacement of the texture of an apparel with a different texture, also taking care of the wrinkles, body shape etc. The apparel worn by the user is identified/localized in all the frames of a video file, and replaced with a pre-identified texture from the catalogue. Multiple histograms are calculated to localize the region of the apparel using Correlation coefficient. The variation in light intensity is used to capture the wrinkles and folds etc on the apparel.

16 Claims, 2 Drawing Sheets

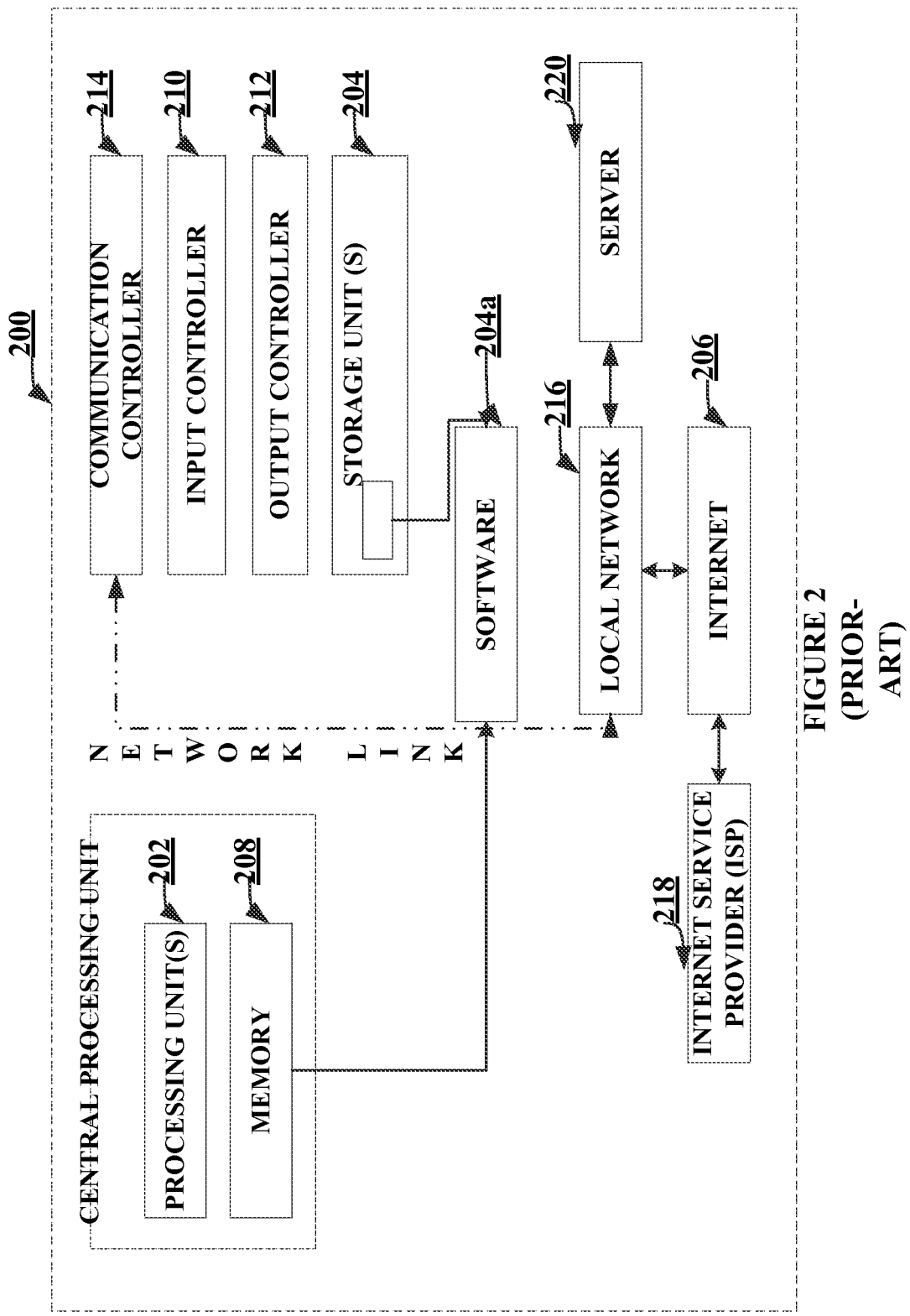
FIGURE 2 (PRIOR-ART)

METHOD FOR REPLACING A TEXTURE OF AN APPAREL WITH AN OTHER TEXTURE PRESERVING THE WRINKLES, IN A VIDEO FILE

RELATED APPLICATION DATA

This application claims priority to India Patent Application No. 6084/CHE/2013, filed Dec. 26, 2013, the disclosure of which is hereby incorporated by reference in its entirety.

FIELD OF THE INVENTION

The present invention relates to extraction of apparel on a person and its virtual replacement by any chosen sample image of apparel, using image processing.

BACKGROUND

In a garment show room, it is usual practice to physically try displayed apparels, say, shirts to find out whether they suit a buyer. However, this could lead to considerable time in wearing every shirt, from the buyer's point of view and could cause wrinkles, soil or may cause damage to the shirts from the seller's point of view.

Conventional technologies that provide virtual trying of apparels use Augmented Reality, MS Kinect, and some reference measurements with a reference to an external device, such as DVD.

SUMMARY

The summary provides for virtual trial of an apparel which also takes care of texture, color, folds and wrinkles, and body-shape of the person wearing the apparel. The procedure is based on near-real time computation based on video. It involves identification of shirt's color and design in terms of histograms in a chosen color space, carries out histogram correlation, thresholding for apparel region capture, wrinkle capture and replication of another design on the person characterized in terms of texture and color. From a video recording of a user wearing an apparel, multiple histograms are calculated to localize the region of the apparel using Correlation coefficient. The variation in light intensity is used to capture the wrinkles and folds etc on the apparel.

The present disclosure provides a method for replacing a texture of an apparel with an other texture in a video file, the method comprising calculating a reference histogram of the apparel in a current frame of the video file, refining the reference histogram by removing a background histogram and a skin histogram in the current frame, from the calculated reference histogram, dividing the current frame into overlapping subimages, and calculating a sample histogram for each subimage in the current frame, localizing the apparel in the current frame by comparing the updated reference histogram with the sample histogram for each image window, identifying the variation in light intensity in the localized apparel in the current frame, replacing the localized apparel with the other texture, applying the identified variation in light intensity to the replaced other texture; and updating the refined reference histogram with the histogram of the localized apparel region of the current frame; repeating the above steps till last frame of the video file using the updated reference histogram.

The present disclosure also provides a computer system for replacing a texture of an apparel with an other texture in a video file, the system comprising, a memory, a processor comprising means configured to perform the steps of, calculating a reference histogram of the apparel in a current frame of the video file, refining the reference histogram by removing a background histogram and a skin histogram in the current frame, from the calculated reference histogram; dividing the current frame into overlapping subimages, and calculating a sample histogram for each subimage in the current frame, localizing the apparel in the current frame by comparing the updated reference histogram with the sample histogram for each image window, identifying the variation in light intensity in the localized apparel in the current frame, replacing the localized apparel with the other texture, applying the identified variation in light intensity to the replaced other texture; and updating the refined reference histogram with the histogram of the localized apparel region of the current frame, repeating the above steps till last frame of the video file using the updated reference histogram.

The present disclosure also provides a computer program product comprising a non-transitory computer-readable medium having a computer-readable program product embodied therein for replacing a texture of an apparel with an other texture in a video file, wherein the computer readable program product comprises program instruction means for performing the method steps as mentioned above.

BRIEF DESCRIPTION OF THE DRAWINGS

FIG. 2 describes a preferred embodiment of implementation of the current system.

DETAILED DESCRIPTION

Figure 1:
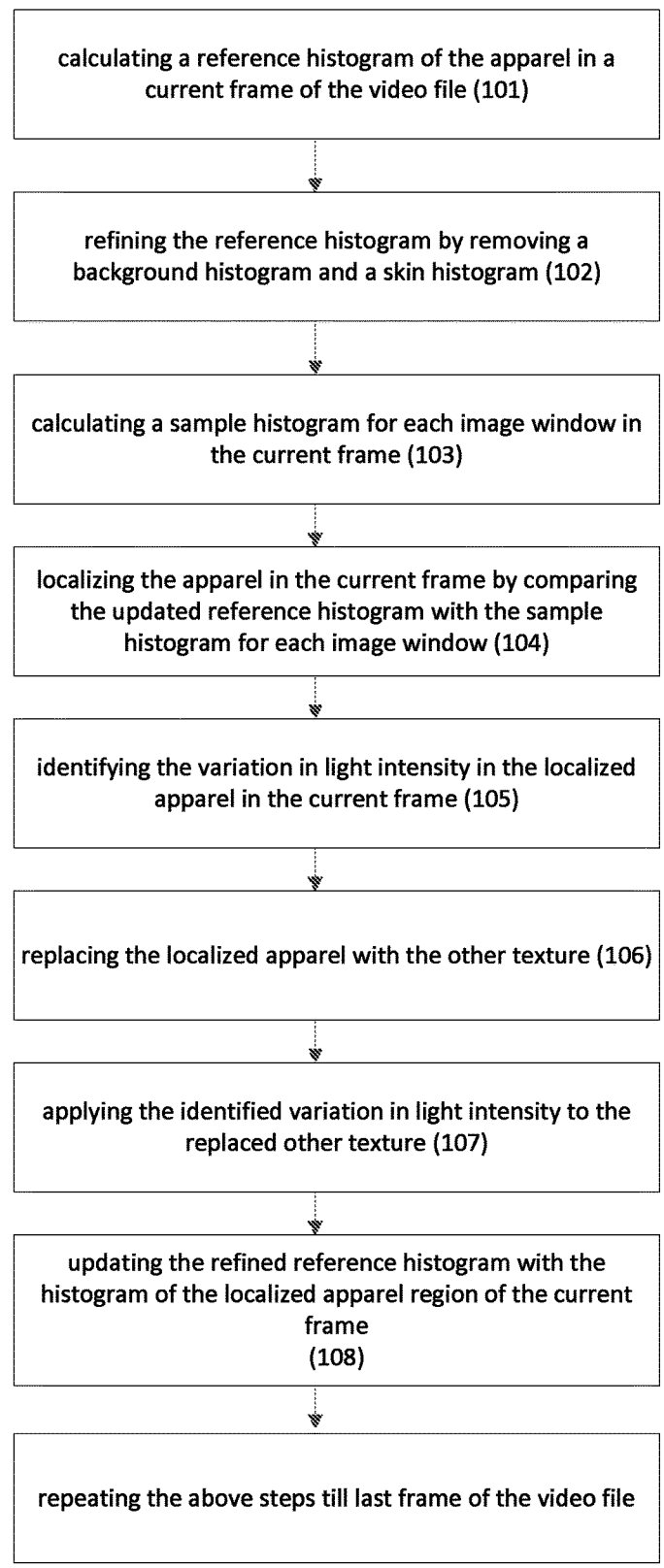
FIG. 1 is a flowchart describing the essential steps of a preferred embodiment of the present invention.

Virtual Apparel Trials have a large number of applications, which helps in physical shopping as well as online commerce. The present disclosure helps to display a person trying a shirt from a given catalogue along with preserving the person's body shape and wrinkles that arise out of body shape, and posture thus providing a realistic wrapping of shirt on a person. The solution can be extended to other apparels include Indian saree which contains multiple folds when draped. The activity involves video capture of a person visiting a store or through online as a starting point. The present procedure involves automatic computation. The initial input of shirt sample is provided by manual clicking on part of shirt. The sample shirt design that requires to be draped is obtained from a catalogue.

As a part of the disclosure, the apparel worn by the user is identified/localized in the video frames, and replaced with a pre-identified texture from the catalogue.

FIG. 1 describes a preferred embodiment of the essential steps of the present disclosure. A preferred embodiment of the present invention requires a video of the person who wishes the virtual try of apparel. This video file can be created for the user, or it can be an old video file if the user is doing online shopping.

The present disclosure works on various frames of the video file. If it is the first frame, the user clicks on a portion of the apparel. A reference histogram is calculated for the portion of the apparel (101). The histogram can be calculated using a (Y,Cb,Cr) color space. In a preferred embodiment, a histogram can be calculated by dividing the entire range of values into a series of small intervals and then count how many values fall into each interval. A rectangle is drawn with height proportional to the count and width equal to a bin size, so that rectangles abut each other. The reference histogram of portion of the apparel might have included a portion of the background, or the skin of the user. This needs to be removed since the apparel worn by the user has to be localized. Accordingly, the histogram of the background, and the histogram of the skin portion of the user is calculated. This is removed from the reference histogram (102). In step 103, there are overlapping image windows identified altogether covering the entire current frame. This is done to correctly obtain the apparel region. This sample histogram for each window is compared with the reference histogram (104). Based on the comparison result, the apparel region in the frame is identified.

In an embodiment of the present invention, once the apparel region in a frame is identified, the creases and curves on the worn apparel is identified. In a preferred embodiment, this is done by identifying variation in the light intensity on the identified apparel region (105). Since at the area of curved, and creases and wrinkles, there will be a shadow of the same, hence the variation in light intensity helps in identifying the creases etc.

Once the apparel region and the creases etc in a frame have been identified, the texture of the present apparel can be replaced with a different texture selected from a catalogue (106).

The variation in light intensity captured in the previous textures, can be applied to this texture (107). This will give a more realistic and satisfactory trial effect to the user. Because of capturing the curves and creases, the body shape of the user is also captured. Hence while replacing the texture, it gives a realistic image of the user actually wearing the apparel of the chosen texture.

The histogram of the localized apparel is calculated to update the reference histogram In a preferred embodiment, the above steps are repeated for every frame so that the user's image has a replaced texture for his apparel in the complete video file (108).

The following provides a detailed explanation of a preferred embodiment of the present disclosure. For the purpose of explanations we use the example of a shirt on a user. The present disclosure can be implemented on any apparel. The user can implement this on an online shopping or walking in to a showroom. In an embodiment, one video file of the user is required for working the process of the present disclosure. In an online shopping, a preexisting video file of the user can be submitted.

Initially a section on the user's shirt is manually selected. This forms a sample of the garment that needs to be captured in terms of image statistical metric. The capture helps in localizing the shirt for its replacement at a later stage. This is done only for the first frame of the video file.

In a preferred embodiment, $YC_bC_r$ color space is chosen for the study. The range of Y is divided into 8 equal regions and $C_b$ vs $C_r$ is analyzed for each region. The corresponding histograms capture the region. For the purpose of explanation in the present document, we name it as the reference histogram.

For correctly localizing the apparel region, the reference histogram should not include any area of the background of the video frame, or the skin of the user. It should only be the apparel. In one embodiment, this is taken care by removing the background and skin histogram from the reference histogram. Four sample histograms from four corners of the original image are considered to be representative of the background of the video sample. To prevent the reference histogram from including any feature of the background or the skin, the skin histogram and the four representative background histograms are removed from the reference histogram. We term this as refined histogram for the purpose of this document.

The skin histogram is calculated by using the typical skin $(YC_bC_r)$ range. In one embodiment, a typical Indian skin $(YC_bC_r)$ range can be used. In a different embodiment, any preferable skin range can be used.

In one embodiment, for localizing the apparel, the current frame is divided into overlapping image windows with a fixed area of overlap. The image windows can be formed using each of the coordinate of the frame. The overlap can be fixed to 50% or any other amount as desired by the user. For each subimage, a histogram is calculated. For the purpose of this document, we call it a sample histogram.

The refined reference histogram is compared with the sample histogram of each of the image window. This identifies the area of the apparel worn by the user.

In a preferred embodiment, the comparison of the refined reference histogram and sample histogram includes calculating a correlation coefficient between them. Since correlation coefficient lies between −1.0 and 1.0, it can be scaled by 255.0 and ceil the negative values to 0. Thus a grayscale image of the same size (width and height) of the original image is obtained, where only the region corresponding to the apparel will be bright whereas the regions corresponding to outside the apparel will be relatively dark. Since the skin and background histograms have been removed, there will typically be no overflow onto the face and/or hands and background outside the shirt. Based on a dynamic single threshold, the grayscale image of the scaled correlation coefficient above will be thresholded to yield a binary shirt image. This provides an initial localized shirt region. The threshold can be the average of the grayscale image within the localized apparel of the previous frame.

In a preferred embodiment, an average of the grayscale image of the localized apparel region of the previous frame is calculated. The correlation coefficient frame is binarized using the calculated average value as threshold to get the final localized apparel. In one embodiment, the localized apparel can now be replaced with the new texture chosen by the user.

In yet another embodiment, the wrinkles, creases and body shape are captured by analyzing the variation in light intensity on the localized apparel. In one embodiment, this is done by multiplying the square of the ratio of the instantaneous Y component of the apparel in (Y,Cb,Cr) to the average Y component of the apparel, with the replaced texture.

In one embodiment, ratio of the intensity at a subwindow around each pixel of the apparel to the average intensity of all pixels of the apparel is calculated. All the subwindows are of a fixed user desired dimension. Another ratio of the average intensity of the other texture to 255 is calculated. A product of the first ratio and the second ratio with the actual intensity of the other texture in the localized apparel region to reproduce the light intensity variation of the apparel on the other texture is then calculated. This gives a variation in intensity in the original apparel.

A parabola is fit to the cusp between the collars of the shirt based on least squares quadratic fit if the image is frontal. The second derivative of the parabola is used to conclude if the image is frontal. The bottom of the cusp and the left and right sides of the cusp are used to introduce the buttons, left and right collar respectively.

In another embodiment, a bounding box is constructed for torso. The bounding box is used as a mask for the next frame so that any underflow in extracting the shirt, such (YCrCb) values will also be added to the reference histogram.

In another embodiment, the reference histogram is updated with the histogram of the localized apparel region of the current frame In a preferred embodiment, this procedure is repeated for all frames of the video, so that user's apparel is replaced, and the user can see the same video file with the substituted apparel or texture.

As earlier mentioned, in case of the first frame of the video file, a portion of the apparel is to be selected and a reference histogram is calculated. For subsequent frames, the reference histograms are added cumulatively to the reference histograms of all the frames upto the present frame in a geometrically decreasing exponent of 0.5 from current frame.

The following describes an implementation of a preferred embodiment of the present disclosure.

The present disclosure comprises a computer implemented system for implementing the above mentioned procedure. In one embodiment the system comprises memory and processor and instructions to perform the steps as mentioned above.

The system also comprises means to accept as input the video file of the user. Further, the system comprises means to initially select a portion of the apparel.

In a preferred embodiment, the system is configured for calculating histogram for a particular portion of the apparel, removing the skin and background histogram, localizing the present apparel worn by the user in the current frame, identifying the wrinkles and body shape in the localized apparel and replacing the localized apparel with a desired texture.

The system is further configured to carry out the further detailed process as mentioned in the earlier paragraphs.

The system comprises means to display the video file wherein the present texture of the apparel is replaced by the selected texture.

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

FIG. 2 (PRIOR-ART) is a block diagram of a computing device 200 to which the present disclosure may be applied according to an embodiment of the present disclosure. The system includes at least one processor 202, designed to process instructions, for example computer readable instructions (i.e., code) stored on a storage device 104. By processing instructions, processing device 202 may perform the steps and functions disclosed herein. Storage device 204 may be any type of storage device, for example, but not limited to an optical storage device, a magnetic storage device, a solid state storage device and a non-transitory storage device. The storage device 204 may contain software 204a which is a set of instructions (i.e. code). Alternatively, instructions may be stored in one or more remote storage devices, for example storage devices accessed over a network or the internet 206. The computing device also includes an operating system and microinstruction code. The various processes and functions described herein may either be part of the microinstruction code or part of the program (or combination thereof) which is executed via the operating system. Computing device 200 additionally may have memory 208, an input controller 210, and an output controller 212 and communication controller 214. A bus (not shown) may operatively couple components of computing device 200, including processor 202, memory 208, storage device 204, input controller 210 output controller 212, and any other devices (e.g., network controllers, sound controllers, etc.). Output controller 210 may be operatively coupled (e.g., via a wired or wireless connection) to a display device (e.g., a monitor, television, mobile device screen, touch-display, etc.) in such a fashion that output controller 210 can transform the display on display device (e.g., in response to modules executed). Input controller 208 may be operatively coupled (e.g., via a wired or wireless connection) to input device (e.g., mouse, keyboard, touch-pad, scroll-ball, touch-display, etc.) in such a fashion that input can be received from a user. The communication controller 214 is coupled to a bus (not shown) and provides a two-way coupling through a network link to the internet 106 that is connected to a local network 216 and operated by an internet service provider (hereinafter referred to as 'ISP') 218 which provides data communication services to the internet. Network link typically provides data communication through one or more networks to other data devices. For example, network link 216 may provide a connection through local network 216 to a host computer, to data equipment operated by an ISP 218. A server 220 may transmit a requested code for an application through internet 206, ISP 218, local network 216 and communication controller 214. Of course, FIG. 1 illustrates computing device 200 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 200 may be one or more servers, for example a farm of networked servers, a clustered server environment, or a cloud network of computing devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for replacing a texture of an apparel with another texture in a video file, the method comprising:
    calculating a reference histogram of the apparel in a current frame of the video file;
    refining the reference histogram by removing a background histogram and a skin histogram in the current frame from the calculated reference histogram;
    dividing the current frame into overlapping subimages and calculating a sample histogram for each subimage in the current frame;

localizing the apparel in the current frame by comparing the refined reference histogram with the sample histogram for each image window;
identifying a variation in light intensity in the localized apparel in the current frame;
replacing the localized apparel with the other texture;
applying the identified variation in light intensity to the replaced other texture;
updating the refined reference histogram with a histogram of the localized apparel region of the current frame; and
repeating the above steps until a last frame of the video file using the updated reference histogram.

2. The method as claimed in claim 1, further comprising using a $(Y, C_b, C_r)$ color space.

3. The method as claimed in claim 1, wherein the step of calculating the reference histogram when the current frame is the first frame of the video file, comprises—
selecting a portion on the apparel on the first frame; and
calculating a histogram for the selected portion of the apparel.

4. The method as claimed in claim 1, wherein the skin histogram is calculated by the typical skin $(Y, C_b, C_r)$ range.

5. The method as claimed in claim 1, wherein the background histogram is calculated by using four histograms from four corners of the current frame.

6. The method as claimed in claim 5, wherein the step of localizing the apparel in the current frame comprises:
calculating a correlation coefficient between the sample histogram of each image window and the refined reference histogram;
creating a grayscale image by scaling the calculated correlation coefficient by 255.0 and replacing a negative value of the calculated correlation coefficient frame with 0.0;
binarizing the grayscale image with a threshold to get an initial localized apparel;
calculating an average of the grayscale image in a region within the initial localized apparel; and
binarizing the correlation coefficient frame using the calculated average value as a threshold to get the final localized apparel.

7. The method as claimed in claim 1, wherein the step of calculating a sample histogram for each image window, comprises calculating a sample histogram for a region of predefined dimensions, centered around each value of (x,y) coordinate in the current frame.

8. The method as claimed in claim 1, wherein the step of identifying the variation in light intensity, comprises,
calculating a first ratio of intensity at a subwindow of predetermined dimension around each pixel of an apparel to an average intensity of all pixels of the apparel;
calculating a second ratio of the average intensity of the other texture to 255; and calculating a product of the first ratio and the second ratio with an actual intensity of the other texture in the localized apparel region to reproduce the light intensity variation of the apparel on the other texture.

9. The method as claimed in claim 1, further comprising identifying an area of attachments on the apparel.

10. The method as claimed in claim 9, wherein the attachments comprise collars and buttons, said collars and buttons being identified by using a cusp of a parabola in a least square quadratic fit process.

11. A computer system for replacing a texture of an apparel with an other texture in a video file, the system comprising:

a memory; and
a processor comprising means configured to perform the steps of:
calculating a reference histogram of the apparel in a current frame of the video file;
refining the reference histogram by removing a background histogram and a skin histogram in the current frame from the calculated reference histogram;
dividing the current frame into overlapping subimages and calculating a sample histogram for each subimage in the current frame;
localizing the apparel in the current frame by comparing the refined reference histogram with the sample histogram for each image window;
identifying a variation in light intensity in the localized apparel in the current frame;
replacing the localized apparel with the other texture;
applying the identified variation in light intensity to the replaced other texture;
updating the refined reference histogram with a histogram of the localized apparel region of the current frame; and
repeating the above steps until a last frame of the video file using the updated reference histogram.

12. The system as claimed in claim 11, further comprising means configured for,
selecting a portion on the apparel on the first frame; and
calculating a histogram for the selected portion of the apparel.

13. The system as claimed in claim 11, further comprising means configured for calculating a sample histogram for a region of predefined dimensions, centered around each value of (x,y) coordinate in the current frame.

14. The system as claimed in claim 13, further comprising means configured for: calculating a correlation coefficient between the sample histogram of each image window and the refined reference histogram;
creating a grayscale image by scaling the calculated correlation coefficient by 255.0 and replacing a negative value of the calculated correlation coefficient frame with 0.0;
binarizing the grayscale image with a threshold (as an average of the grayscale image in the region within the localized apparel of the previous frame) to get an initial localized apparel;
calculating an average of the grayscale image in a region within the initial localized apparel;
binarizing the correlation coefficient frame using the calculated average value as threshold to get the final localized apparel.

15. The system as claimed in claim 11, further comprising means configured for: calculating a first ratio of intensity at a subwindow of predetermined dimension around each pixel of the apparel to an average intensity of all pixels of the apparel;
calculating a second ratio of an average intensity of the other texture to 255; and
calculating a product of the first ration and the second ratio with an actual intensity of the other texture in the localized apparel region to reproduce the light intensity variation of the apparel on the other texture.

16. A computer program product comprising a non-transitory computer-readable medium having a computer-readable program product embodied therein for replacing a texture of an apparel with an other texture in a video file, wherein the computer readable program product comprises program instructions for performing operations, the operations comprising:
- calculating a reference histogram of the apparel in a current frame of the video file;
- refining the reference histogram by removing a background histogram and a skin histogram in the current frame from the calculated reference histogram;
- dividing the current frame into overlapping subimages and calculating a sample histogram for each subimage in the current frame;
- localizing the apparel in the current frame by comparing the refined reference histogram with the sample histogram for each image window; identifying a variation in light intensity in the localized apparel in the current frame; replacing the localized apparel with the other texture;
- applying the identified variation in light intensity to the replaced other texture;
- updating the refined reference histogram with a histogram of the localized apparel region of the current frame; and
- repeating the above steps until a last frame of the video file using the updated reference histogram.

* * * * *